United States Patent
Lee et al.

(10) Patent No.: US 11,614,827 B2
(45) Date of Patent: Mar. 28, 2023

(54) TOUCH CIRCUIT, TOUCH DISPLAY DEVICE, AND TOUCH DRIVING METHOD THEREOF, FOR GENERATING TOUCH DRIVING SIGNAL IN SYNC WITH PEN DRIVING SIGNAL

(71) Applicant: LG Display Co., Ltd., Seoul (KR)

(72) Inventors: HongJu Lee, Seoul (KR); Youngwoo Jo, Gyeonggi-do (KR); HyunWoo Jang, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/395,150

(22) Filed: Aug. 5, 2021

(65) Prior Publication Data

US 2022/0057909 A1  Feb. 24, 2022

(30) Foreign Application Priority Data

Aug. 19, 2020 (KR) .................. 10-2020-0104137

(51) Int. Cl.
*G06F 3/041* (2006.01)
*G06F 3/0354* (2013.01)
*G06F 3/044* (2006.01)

(52) U.S. Cl.
CPC ...... *G06F 3/04162* (2019.05); *G06F 3/03545* (2013.01); *G06F 3/0412* (2013.01); *G06F 3/044* (2013.01)

(58) Field of Classification Search
CPC ............. G06F 3/04162; G06F 3/03545; G06F 3/0412; G06F 3/044
See application file for complete search history.

(56) References Cited

U.S. PATENT DOCUMENTS

2018/0113559 A1* 4/2018 Bae ................. G06F 3/0412

* cited by examiner

*Primary Examiner* — Lisa S Landis
(74) *Attorney, Agent, or Firm* — Birch, Stewart, Kolasch & Birch, LLP

(57) ABSTRACT

Discussed is a touch display device, including a display panel on which a touch screen panel including a plurality of touch electrodes is embedded, and a touch control unit configured to generate a pen detection signal corresponding to a pen driving signal of a stylus from a touch sensing signal transmitted from the display panel, and generate a touch driving signal synchronized with the pen driving signal of the stylus by using the pen detection signal.

14 Claims, 15 Drawing Sheets

TDS

(Case 1) TDS1

(Case 2) TDS2

(Case 3) TDS3

(a)

(b)

TOUCH CIRCUIT, TOUCH DISPLAY DEVICE, AND TOUCH DRIVING METHOD THEREOF, FOR GENERATING TOUCH DRIVING SIGNAL IN SYNC WITH PEN DRIVING SIGNAL

CROSS-REFERENCE TO RELATED APPLICATION

This application claims the priority benefit of Korean Patent Application No. 10-2020-0104137, filed on Aug. 19, 2020 in the Korean Intellectual Property Office, the entire contents of which are hereby expressly incorporated herein by reference in its entirety into the present application.

BACKGROUND

1. Technical Field

The present disclosure relates to touch circuits, touch display devices and touch driving methods.

2. Discussion of the Related Art

As the information-oriented society has been developed, various needs for display devices for displaying an image have increased. Recently, various types of display devices, such as a Liquid Crystal Display (LCD) device, a Plasma Display Panel (PDP) device, and an Organic Light Emitting display (OLED), have been utilized.

Meanwhile, in providing a touch input function in display devices, for providing thin portable devices, such as a smart phone, a tablet PC, or the like, an in-cell type touch display device in which components for a touch screen are integrated inside of the display panel of the touch display device has been developed and utilized.

Such a touch display device uses the common electrode for driving each pixel as a touch electrode for touch sensing. Accordingly, during a display driving period, a common voltage is provided to at least one thin film transistor, and during a touch driving period, a touch driving signal is provided to at least one touch electrode.

In the touch display device, driving for a touch is normally driven only once during one frame, which is an image refresh rate of a display panel or one cycle of a frame frequency. For example, when the frame frequency is 60 Hz, after performing display driving that turns one or more pixels on or off through N gate lines included in a touch screen panel TSP within a horizontal period of 1/60s, then touch driving for touch sensing is performed during a pre-configured interval. In other words, this can be represented as the touch report rate of 60 Hz.

Meanwhile, for a touch input for the touch display device, not only a passive stylus such as a finger, but an active stylus capable of transmitting signals to, and/or receiving signals from, the display panel can be used. The passive stylus has a disadvantage in that it can be difficult to detect the touch position because the change in capacitance at the point of contact with the display panel may be very small. On the other hand, the active stylus has an advantage in that it is easier to detect the touch position compared to the passive stylus because the active stylus generates a pen driving signal and outputs it to a point close to or in contact with the display panel.

However, in order to use the active stylus in a touch display device, the pen driving signal of the active stylus and the touch driving signal of the touch display device need to be synchronized. To this end, the active stylus receives an uplink signal transmitted from the touch display device, synchronizes the pen driving signal with the uplink signal, and outputs it.

For example, the touch display device transmits a beacon signal or a ping signal including information on the display panel to the active stylus, and then, the active stylus can determine a state of the display panel using the beacon signal or the ping signal and output a pen driving signal through a process of synchronization.

However, if the touch display device does not support a protocol for transmitting the beacon signal or the ping signal, it can be difficult to sense the pen touch because the touch driving signal applied to the display panel and the pen driving signal transmitted from the active stylus may not be synchronized well.

In addition, since the active stylus has a small pen-shaped structure, it can be important to reduce power consumption. When the active stylus receives the uplink signal transmitted from the touch display device and generates the pen driving signal synchronized with the touch driving signal there can be a limitation that the power consumption of the active stylus can increase.

SUMMARY OF THE INVENTION

In accordance with embodiments of the present disclosure, a touch circuit, a touch display device, and a touch driving method are provided for simply generating a touch driving signal synchronous to a pen driving signal transmitted from a stylus.

In accordance with embodiments of the present disclosure, a touch circuit, a touch display device, and a touch driving method are provided for easily generating the touch driving signal synchronous to the pen driving signal by using a base pulse signal transmitted in a base period at a predetermined interval among the pen driving signals transmitted from the stylus.

In accordance with embodiments of the present disclosure, a touch circuit, a touch display device, and a touch driving method are provided for generating the touch driving signal synchronous to the pen driving signal of an active stylus in a touch display device, thereby simplifying the configuration of an active stylus and reducing power consumption.

In accordance with embodiments of the present disclosure, a touch circuit, a touch display device, and a touch driving method are provided for generating the touch driving signal synchronous to the pen driving signal of the stylus in the touch display device, thereby sensing the pen driving signal of the stylus irrespective of the protocol with the stylus.

In accordance with one aspect of the present disclosure, a touch display device is provided that includes a display panel in which a touch screen panel including a plurality of touch electrodes is embedded, and a touch control unit configured to generates a pen detection signal corresponding to a pen driving signal of a stylus from a touch sensing signal transmitted from the display panel, and generates a touch driving signal synchronized with the pen driving signal of the stylus by using the pen detection signal.

In accordance with one aspect of the present disclosure, the pen driving signal is divided into a base period in which data related to the stylus is not included and a sensing period in which the data related to the stylus is include, and the touch driving signal is synchronized with the pen driving signal in the sensing period.

In accordance with one aspect of the present disclosure, the pen detection signal is a signal generated by the pen driving signal in the base period.

In accordance with one aspect of the present disclosure, the pen driving signal and the touch driving signal are synchronized in a positive phase or an inverse phase.

In accordance with one aspect of the present disclosure, the touch control unit comprises a pen detection circuit for generating the pen detection signal corresponding to the pen driving signal from the touch sensing signal; a peak detection circuit for detecting a peak period and a peak value in which the pen detection signal indicates a high level; a counter for counting the number of times the pen detection signal maintains the high level during a reference period including a last high level within the base period based on a main clock; a delay circuit for sequentially delaying the initial touch driving signal according to the main clock; a multiplexer for overlapping the initial touch driving signal delayed through the delay circuit and the peak value and the peak period of the pen detection signal transmitted through the counter; and a touch driving signal generation circuit configured to generate a touch driving signal according to a point in time when an overlapping area of the initial touch driving signal and the pen detection signal is largest.

In accordance with one aspect of the present disclosure, the pen detection circuit comprises a pre-amplification circuit for amplifying the touch sensing signal; and a comparison circuit for comparing the output signal of the pre-amplification circuit and the reference signal.

In accordance with one aspect of the present disclosure, the pre-amplification circuit comprises an operational amplifier for receiving the touch sensing signal through an inverting input terminal; and a feedback capacitor and a reset switch connected in parallel between the non-inverting input terminal and the output terminal of the operational amplifier.

In accordance with one aspect of the present disclosure, the reset switch is turned off by a low-level reset signal during the base period, and the pre-amplification circuit generates an output signal that is toggled in a direction opposite to the base pulse signal.

In accordance with one aspect of the present disclosure, the multiplexer overlaps the initial touch driving signal and the pen detection signal during a reference period including a last high level in the base period based on a main clock.

In accordance with another aspect of the present disclosure, a touch circuit is provided that includes a pen detection circuit for generating the pen detection signal corresponding to the pen driving signal from the touch sensing signal, a peak detection circuit for detecting a peak period and a peak value in which the pen detection signal indicates a high level, a counter for counting the number of times the pen detection signal maintains the high level during a reference period including a last high level within the base period based on a main clock, a delay circuit for sequentially delaying the initial touch driving signal according to the main clock, a multiplexer for overlapping the initial touch driving signal delayed through the delay circuit and the peak value and the peak period of the pen detection signal transmitted through the counter and a touch driving signal generation circuit configured to generate a touch driving signal according to a point in time when an overlapping area of the initial touch driving signal and the pen detection signal is largest.

In accordance with further another aspect of the present disclosure, a touch driving method is provided that includes generating a pen detection signal corresponding to a pen driving signal of a stylus from a touch sensing signal transmitted from a display panel; and generating the touch driving signal synchronized with the pen driving signal of the stylus using a pen detection signal.

In accordance with embodiments of the present disclosure, it is possible to provide a touch circuit, a touch display device, and a touch driving method for simply generating a touch driving signal synchronous to a pen driving signal transmitted from a stylus.

In accordance with embodiments of the present disclosure, it is possible to provide a touch circuit, a touch display device, and a touch driving method for easily generating the touch driving signal synchronous to the pen driving signal by using a base pulse signal transmitted in a base period at a predetermined interval among the pen driving signals transmitted from the stylus.

In accordance with embodiments of the present disclosure, it is possible to provide a touch circuit, a touch display device, and a touch driving method for generating the touch driving signal synchronous to the pen driving signal of an active stylus in a touch display device, thereby simplifying the configuration of an active stylus and reducing power consumption.

In accordance with embodiments of the present disclosure, it is possible to provide a touch circuit, a touch display device, and a touch driving method for generating the touch driving signal synchronous to the pen driving signal of the stylus in the touch display device, thereby sensing the pen driving signal of the stylus irrespective of the protocol with the stylus.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

In the accompanying drawings.

DETAILED DESCRIPTION OF THE EMBODIMENTS

Figure 1:
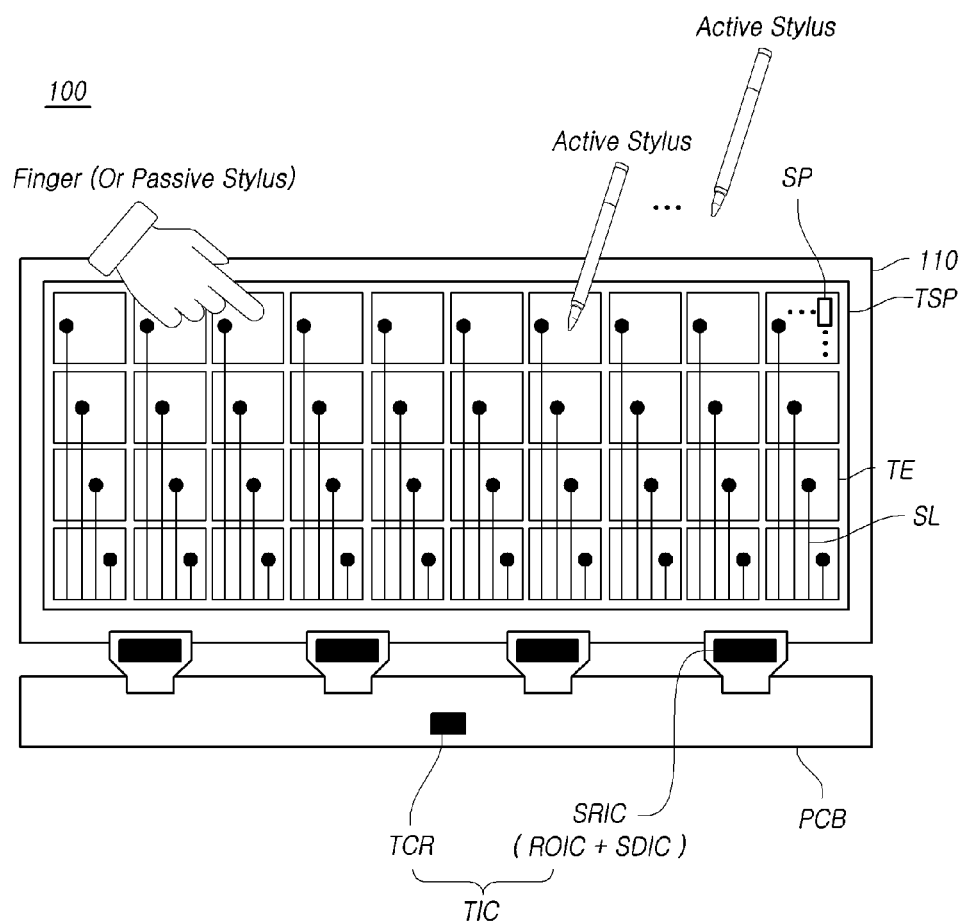
FIG. 1 illustrates a block diagram of a touch display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another.

Further, in the following description of examples or embodiments of the present invention, detailed descriptions of well-known functions and components incorporated herein will be omitted when it is determined that the description can make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

FIG. 1 illustrates a block diagram of a touch display device according to embodiments of the present disclosure. All the components of each touch display device according to all embodiments of the present disclosure are operatively coupled and configured.

Referring to FIG. 1, a touch display device 100 according to embodiments of the present disclosure can be, for example, a display device capable of providing a function of sensing a touch of a passive stylus such as a finger, a conductive object, or the like, and a function of sensing a touch of an active stylus such as a pen, in addition to a function of displaying images.

The touch display device 100 according to embodiments of the present disclosure can be a display device in which a touch screen panel TSP including a plurality of touch electrodes TE as touch sensors is embedded into a display panel 110. For example, the touch display device 100 can be a television TV, a monitor, or the like, or a mobile device such as a tablet, a smart phone, or the like.

For example, the touch display device 100 can divide a common electrode used in a display driving period into a plurality of groups and then use the plurality of divided groups as a plurality of touch electrodes TE. In another example, the touch display device 100 can use a plurality of touch electrodes TE as touch sensing electrodes or touch driving electrodes.

The display panel 110 can be a liquid crystal display (LCD) panel, an organic light emitting diode (OLED) panel, or the like.

For example, when the display panel 110 is the liquid crystal display panel, the touch display device 100 can divide a common electrode, to which a common voltage is applied, which forms electric fields with pixel electrodes into a plurality of groups and then use the plurality of divided groups as respective touch electrodes TE.

In another example, when the display panel 110 is the organic light emitting diode (OLED) panel, the touch display device 100 can include an organic light emitting diode (OLED) composed of a first electrode, an organic light emitting layer, and a second electrode, an encapsulation layer located on the OLED and having a encapsulating function, and a touch sensor metal layer located on the encapsulation layer. Here, a plurality of touch electrodes can be formed on the touch sensor metal layer. Meanwhile, the touch electrode TE can be embedded in the display panel 110 in an in-cell type, and the touch screen panel TSP including the touch electrode TE can be configured separately on top of the display panel 110.

Hereinafter, for convenience of description and ease of understanding, it is assumed that a plurality of touch electrodes TE are used as touch driving electrodes (touch sensors) in the process of touch driving, and are used as a common electrode in the process of display driving.

The touch display device 100 can include a touch circuit TIC performing touch sensing and stylus sensing using signals received through the display panel 110 by driving the display panel 110 in which the touch screen panel TSP is integrated.

The touch circuit TIC can include a first circuit for applying the driving signal to the touch electrode TE and receiving the touch signal through a sensing line SL, and a second circuit for detecting whether passive touch sensing (finger touch sensing) and active touch sensing is performed using the touch signal received through the display panel 110.

The first circuit can be referred to as a touch sensing circuit ROIC, and the second circuit can be referred to as a touch controller TCR.

The touch circuit TIC can sense a presence or absence of a touch and a touch position based on a variation in capacitance between the touch electrodes TE formed on the display panel 110. In other words, the variation in capacitance occurs at a position where a passive stylus or the user's finger or an active stylus is in contact with the display panel 110, and the touch circuit TIC detects such a variation in capacitance to senses the touch position. The touch circuit TIC generates the touch sensing output signal for the presence or absence of the touch and transmits it to an external micro control unit.

The micro control unit controls the touch circuit TIC. The micro control unit can receive a touch synchronization signal from a timing controller and generate the touch driving signal for controlling the touch circuit TIC based on the received touch synchronization signal. The micro control unit exchanges the touch sensing detection signal and the touch driving signal based on an interface between the touch circuit TIC and the micro control unit.

Here, the micro control unit can be formed of a single integrated circuit together with the touch controller TCR, or can be formed of a single integrated circuit together with a timing controller. When the micro control unit is formed in the form of one integrated circuit together with the touch controller TCR, the touch sensing circuit ROIC can be referred to as a touch circuit.

A data driving circuit that applies a data voltage to a data line is also called a source driving circuit or a source driving integrated circuit SDIC, and the touch sensing circuit ROIC can be implemented as an integrated driving circuit SRIC together with the data driving circuit SDIC.

The integrated driving circuit SRIC can be implemented in a type of Chip On Film (COF) in which the integrated driving circuit SRIC is mounted on a film, be embedded in the display panel 110 or be mounted on a printed circuit board (PCB).

The film on which the integrated driving circuit SRIC is mounted can be attached to a bonding portion of the display panel 110 and a bonding portion of the printed circuit board (PCB), respectively.

The touch controller TCR etc. can be mounted on the printed circuit board PCB.

The touch sensing circuit ROIC and the data driving circuit SDIC can be implemented as separate driving chips. The touch sensing circuit ROIC can be electrically connected to the plurality of touch electrodes TE included in the display panel 110 through a plurality of sensing lines SL.

At this time, the touch sensing circuit ROIC can perform touch sensing during a touch period from a display driving period separately divided in time. In another example, the touch sensing circuit ROIC can perform touch sensing process and display driving process simultaneously.

Figure 2:
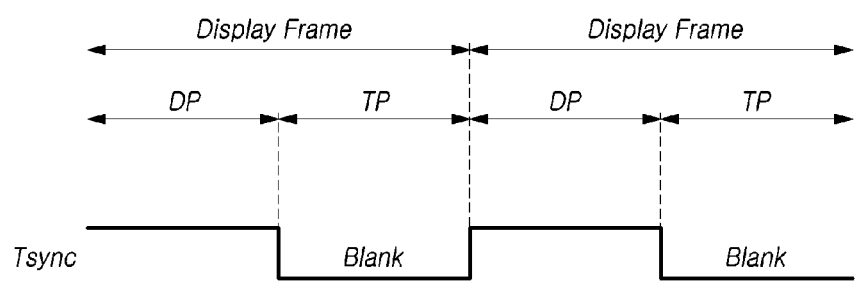
FIG. 2 illustrates timings for configuring a display driving period and a touch driving period in the touch display device according to embodiments of the present disclosure.

FIG. 2 illustrates timings for configuring a display driving period and a touch driving period in the touch display device according to embodiments of the present disclosure.

Referring to FIG. 2, the touch display device 100 according to embodiments of the present disclosure performs display driving for displaying images during the predefined display driving period DP within one display frame, and performs touch driving for sensing a touch input from a finger or a stylus during the predefined touch driving period TP.

The display driving period DP and the touch driving period TP can be separated from each other. Such a driving method can be referred to as a time-division driving.

The display driving and the touch driving can be performed simultaneously. Such a driving method can be referred to as a time-free driving.

In the time-division driving, the display driving period DP and the touch driving period TP can be alternately arranged.

Thus, when the display driving period DP and the touch driving period TP are alternately arranged, the touch driving period TP can correspond to a blank period Blank in which the display driving is not performed.

The touch display device 100 can generate a touch synchronization signal Tsync swang between a high level and a low level, and through this, can identify or control the display driving period DP and the touch driving period TP. For example, the touch synchronization signal Tsync can be a driving timing control signal for defining the touch driving period TP.

For example, a high level period (or a low level period) of the touch synchronization signal Tsync can be corresponded to the display driving period DP, and the low level period (or the high level period) of the touch synchronization signal Tsync can be corresponded to the touch driving period TP.

In this case, the touch sensing circuit ROIC applies the touch driving signal to the touch electrode TE during the touch driving period TP in which the touch synchronization signal Tsync is at the low level, and sense the presence or absence of a touch of the passive stylus or the active stylus and a touch coordinate by using a touch signal received from the touch electrode TE.

Meanwhile, with respect to methods of assigning the display driving period DP and the touch driving period TP in one display frame period, for example, one display frame period can be divided into one display driving period DP and one touch driving period TP, and display driving can be performed during one display driving period DP, and touch driving for sensing a touch input from the passive stylus or finger and the active stylus can be performed during one touch driving period TP corresponding to the blank period Blank.

In another example, one display frame period can be divided into two or more display driving periods DP and two or more touch driving periods TP, and display driving can be performed during two or more display driving periods DP in one display frame period, and touch driving for sensing once or two or more times a touch input from the passive stylus or finger and the active stylus on all or at least a part of a display screen can be performed during two or more touch driving periods TP in one display frame period.

Like this, when dividing one display frame period into two or more display driving periods DP and two or more touch driving periods TP, and then performing the display driving and the touch driving, each of two or more blank periods corresponding to two or more touch driving periods TP in one display frame period is sometimes referred to as a long horizontal blank ("LHB").

Accordingly, two or more periods in which the sensing of a touch from a stylus or a finger is performed in a display frame period can be referred to as LHBs or touch driving periods, and touch driving performed during two or more LHBs in one touch frame period is referred to as "LHB driving".

Figure 3:
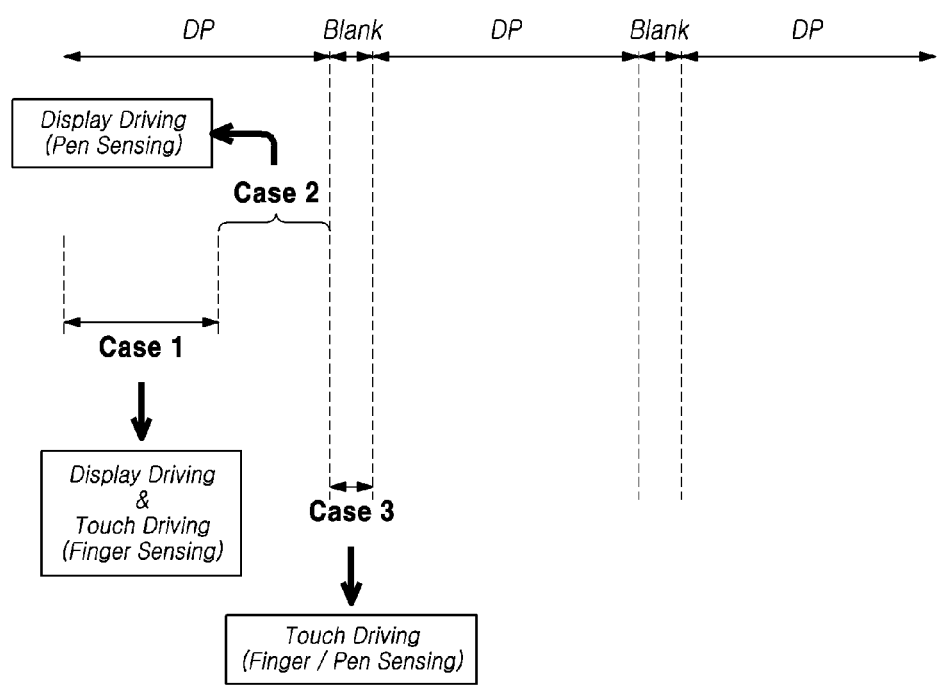
FIG. 3 illustrates examples of three cases of time-free driving in a touch display device according to embodiments of the present disclosure.
Figure 4:
FIG. 4 illustrates touch driving signals according to three cases of time-free driving.
Figure 4:
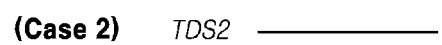
Figure 4:
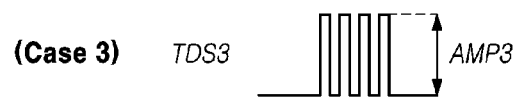

FIG. 3 illustrates examples of three cases of time-free driving in a touch display device according to embodiments of the present disclosure, and FIG. 4 illustrates touch driving signals according to three cases of time-free driving.

Referring to FIGS. 3 and 4, in the first case of time-free driving (Case 1), the touch display device 100 can perform simultaneously a display driving and drive a touch driving.

In the first case (Case 1), in order to perform the touch driving, the touch display device 100 can supply the first touch driving signal TDS1 in the form of a pulse whose voltage is variable to the touch electrode TE. In the first case (Case 1), the first touch driving signal TDS1 applied to the touch electrode TE can have a first amplitude AMP1.

In the first case (Case 1), the touch display device 100 can sense a touch of a finger contacting the display panel 110 by performing the touch driving. This touch sensing can be referred to as a finger sensing.

Alternatively, in the first case (Case 1), the touch display device 100 can perform the touch driving, and senses a touch by a finger or a stylus when the finger or the stylus does not contact the display panel 110 and is close to the display panel 110. This touch sensing can be referred to as a hover sensing.

In the second case (Case 2), the touch display device 100 can only drive the display.

In the second case (Case 2), since it is not necessary to sense a touch by a finger of the touch display device 100, general touch driving process is not performed. For example, in the second case (Case 2), the touch display device 100 does not supply the touch driving signal TDS in the form of a pulse whose voltage is variable to the plurality of touch electrodes TE disposed on the display panel 110.

In the second case (Case 2), the touch display device 100 can supply a second touch driving signal TDS2 in a DC form. In this case, the signal applied to the display panel 110 in the second case (Case 2) is expressed as the second touch driving signal TDS2, but in the second case (Case 2) in which the finger sensing is not performed, the signal applied to the display panel 110 can be viewed as a DC-type common voltage signal that is distinguished from the pulse-type touch driving signals TDS1 and TDS3.

Accordingly, in the first case (Case 1), the pulsed touch driving signal TDS1 is applied to the display panel 110 through the sensing line SL, while, in the second case (Case 2), the DC-type common voltage signal can be applied to the display panel 110 through the sensing line SL.

In the second case (Case 2), the touch display device 100 can sense the stylus by receiving a pen driving signal transmitted from the stylus through the touch electrode TE. The touch display device 100 can sense the pen driving signal of the stylus to find out a position, a tilt, a pressure (pen pressure), or various additional information of the stylus.

In the third case (Case 3), the touch display device 100 can only perform the touch driving.

In the third case (Case 3), in order to perform the touch driving, the touch display device 100 can supply the third touch driving signal TDS3 in the form of a pulse whose voltage is variable to the touch electrode TE. In this case, in the third case (Case 3), the third touch driving signal TDS3 applied to the touch electrode TE can have a third amplitude AMP3 different from the first amplitude AMP1.

In the third case (Case 3), the touch display device 100 can sense a touch of a finger contacting the display panel 110 by performing the touch driving.

The first case (Case 1) of the time-free driving can be performed during the display driving period DP, and the third case (Case 3) can be performed during the blank period (Blank). In this case, the first case (Case 1) can be changed to the second case (Case 2) within the display driving period DP.

For example, during the display driving period DP, the touch display device 100 can perform the display driving and the touch driving together as in the first case (Case 1), and then stop the finger sensing for stylus sensing so as to be changed to the second case (Case 2).

In the first case (Case 1) and the third case (Case 3), when the touch driving for finger sensing is performed, the touch driving signals TDS1 and TDS3 having the first amplitude AMP1 and the third amplitude AMP3 can be respectively applied to the touch electrode TE.

For reference, in the case of time-free driving, since the display driving period DP and the touch driving period TP proceed in the same time, the above-described three cases (Case 1, Case 2 and Case 3) can correspond to the touch driving period TP.

Meanwhile, referring to FIG. 4, when the touch driving is performed together with the display driving (Case 1), the first amplitude AMP1 of the first touch driving signal TDS1 applied to the touch electrode TE can be smaller than the third amplitude AMP3 of the third touch driving signal TDS3 applied to the touch electrode TE when only touch driving is performed (Case 3).

For example, the first amplitude AMP1 of the first touch driving signal TDS1 applied to the touch electrode TE during the display driving period DP can be smaller than the third amplitude AMP3 of the third touch driving signal TDS3 applied to the touch electrode TE during the blank period Blank.

In addition, during the display driving period DP, the touch circuit can supply the first touch driving signal TDS1 having the first amplitude AMP1 or the second touch driving signal TDS2 corresponding to the DC voltage to a plurality of touch electrodes TE.

On the other hand, during the blank period Blank, the touch circuit can supply the third touch driving signal TDS3 having the third amplitude AMP3 to one or more of the plurality of touch electrodes TE.

At this time, the display panel 110 uplinks the beacon signal to the stylus for each frame to perform pairing with the stylus, and uplinks the ping signal within the touch driving period TP to synchronize the sensing time for the pen driving signal of the stylus.

However, when the touch display device 100 does not support a protocol for transmitting the beacon signal or the ping signal, there can occur a case in which the pen touch cannot be sensed because the touch driving signal applied to the display panel 110 is not synchronized with the pen driving signal transmitted from the stylus.

Accordingly, the touch display device 100 of the present disclosure uses a signal of a predetermined period before data is included among the pen driving signals transmitted from the stylus, thereby easily generating the touch driving signal TDS synchronized with the pen driving signal.

Figure 5:
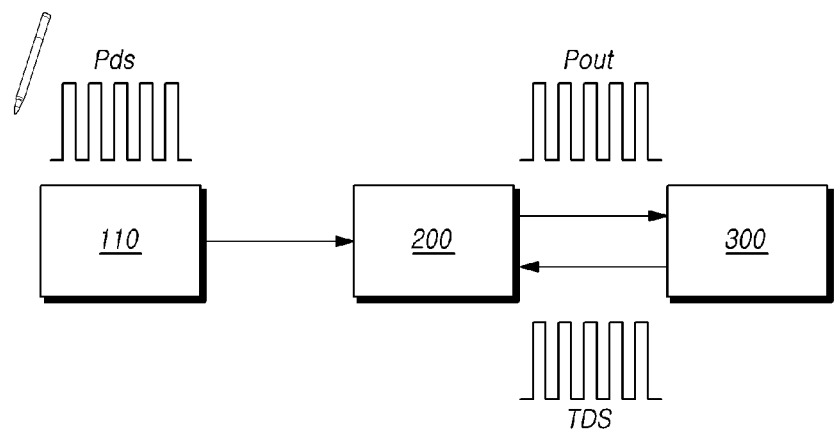
FIG. 5 conceptually illustrates a structure of generating a touch driving signal synchronized with a stylus in a touch display device according to embodiments of the present disclosure.

FIG. 5 conceptually illustrates a structure of generating a touch driving signal synchronized with a stylus in a touch display device according to embodiments of the present disclosure.

Referring to FIG. 5, the touch display device 100 according to embodiments of the present disclosure can include a display panel 110, a touch circuit 200, and a micro control unit 300.

The display panel 110 generates a touch sensing signal TSS by a pen driving signal Pds transmitted from the stylus.

The touch circuit 200 receives the touch sensing signal TSS transmitted from the display panel 110 through a plurality of sensing lines, and generates a pen detection signal Pout by using this.

The micro control unit 300 generates the touch driving signal TDS synchronized with the pen driving signal Pds by using the pen detection signal Pout transmitted from the touch circuit 200, and transmits it to the touch circuit 200.

On the other hand, the function of generating the touch driving signal TDS synchronized with the pen driving signal Pds can be not performed in the separate micro control unit 300, and be performed in the touch controller TCR within the touch circuit 200.

Alternatively, it can be viewed as a touch control unit including the micro control unit 300 and the touch circuit 200, and the micro control unit 300 and the touch circuit 200 can be composed of one integrated circuit to configure a single touch integrated circuit.

Figure 6:
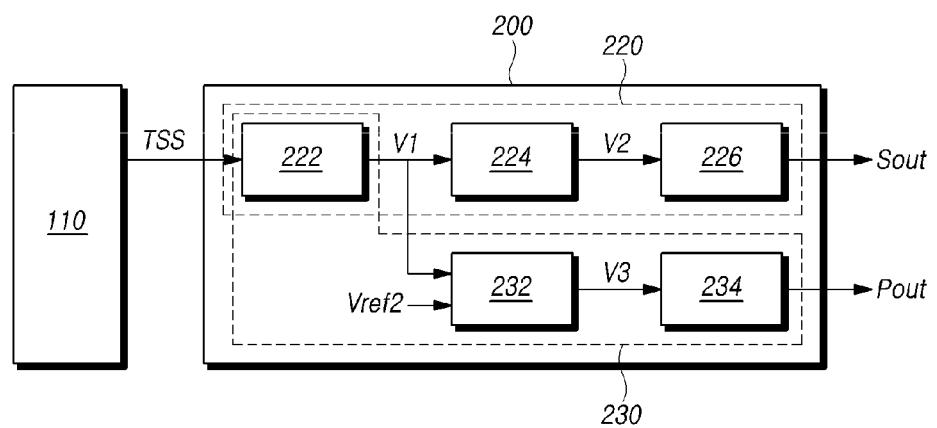
FIG. 6 is a block diagram of a touch circuit in a touch display device according to embodiments of the present disclosure.

FIG. 6 is a block diagram of a touch circuit in a touch display device according to embodiments of the present disclosure.

Referring to FIG. 6, in the touch display device 100 according to embodiments of the present disclosure, the touch circuit 200 can sense a touch and a pen signal by using switched-capacitor circuits as a charge transferring method.

For example, the touch circuit 200 can include a touch detection circuit 220 for generating a touch detection signal Sout for the presence or absence of a touch or a touch position from the touch sensing signal TSS transmitted from the display panel 110 and a pen detection circuit 230 for generating a pen detection signal Pout corresponding to the pen driving signal Pds of the stylus from the touch sensing signal TSS.

The touch circuit 200 can correspond to the touch sensing circuit ROIC described above. Alternatively, the touch controller TCR can be provided inside the touch circuit 200 to determine the presence or absence of a touch and the touch position using the touch sensing detection signal Sout.

The touch detection circuit 220 can include a pre-amplification circuit 222, an integration circuit 224, and a sampling circuit 226. The pen detection circuit 230 can include the pre-amplification circuit 222, a comparison circuit 232, and a level shifter 234.

Figure 7:
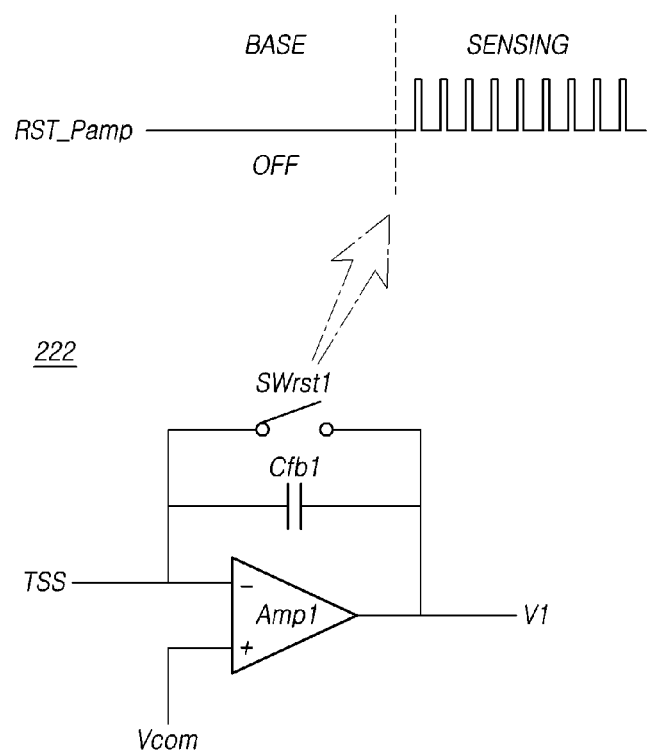
FIG. 7 illustrates an example of a pre-amplification circuit of a touch detection circuit included in a touch circuit in a touch display device according to embodiments of the present disclosure.

FIG. 7 illustrates an example of a pre-amplification circuit of a touch detection circuit included in a touch circuit in a touch display device according to embodiments of the present disclosure.

Referring to FIG. 7, in the touch display device 100 according to embodiments of the present disclosure, the pre-amplification circuit 222 of the touch detection circuit 220 included in the touch circuit 200 is an operational amplifier Amp1 receiving the touch sensing signal TSS through an inverting input terminal (−), a feedback capacitor Cfb connected between the non-inverting input terminal (+) and the output terminal of the operational amplifier Amp1, and a reset switch SWrst1.

The reset switch SWrst1 can reset the pre-amplification circuit 222 by toggling it to be turned on immediately before the pen driving signal Pds is applied. However, in the touch circuit 200 of the present disclosure can generate an output voltage V1 that is toggled in the opposite direction to the pen driving signal Pds and then generate the pen detection signal Pout using this by maintaining the reset switch Swrst1 in the turn-off state OFF for a certain period before data is included in the pen driving signal Pds.

Specifically, the reset switch SWrst1 is turned off by a low-level reset signal RST_Pamp during the base period BASE in which the pen driving signal Pds does not include data related to the stylus. The turn-on and turn-off states can be changed according to the level of the reset signal RST_Pamp during the sensing period SENSING in which the state OFF is maintained, and the data related to the stylus is included in the pen driving signal Pds.

In this case, a common voltage Vcom having a reference level can be applied to the non-inverting input terminal (+) of the operational amplifier Amp1. Accordingly, the operational amplifier Amp1 generates the saw tooth-shaped output voltage V1 that toggles in a direction opposite to the pen driving signal Pds based on the common voltage Vcom, and transmits it to the integrating circuit 224.

Figure 8:
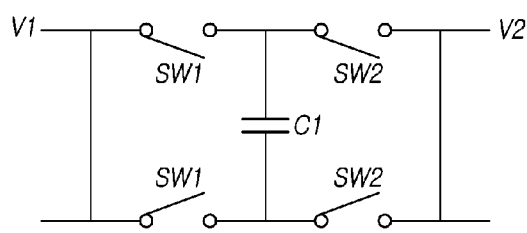
FIG. 8 illustrates an example of an integrating circuit of a touch detection circuit included in a touch circuit in a touch display device according to embodiments of the present disclosure.

FIG. 8 illustrates an example of an integrating circuit of a touch detection circuit included in a touch circuit in a touch display device according to embodiments of the present disclosure.

Referring to FIG. 8, in the touch display device 100 according to embodiments of the present disclosure, the integrating circuit 224 of the touch detection circuit 220 included in the touch circuit 200 can include a plurality of switches SW1 and SW2 and a capacitor C1.

Although the case where the output voltage V1 of the pre-amplification circuit 222 is accumulated in one capacitor C1 by the operation of two first switches SW1 that are turned on and off at the same time and two second switches SW2 that are turned on and off at the same time is described below as an example, the structure of the integrating circuit 224 can be variously changed.

Accordingly, according to the operation of the plurality of switches SW1 and SW2 included in the integrating circuit 224, the output voltage V1 of the pre-amplification circuit 222 is accumulated in the capacitor C1. The output voltage V2 of the integrating circuit 224 accumulated in the capacitor C1 is transmitted to the sampling circuit 226.

Figure 9:
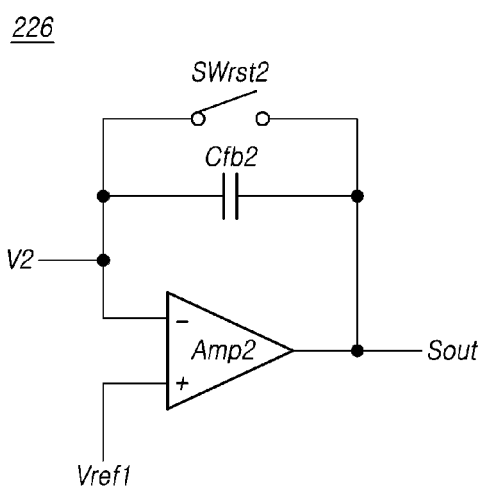
FIG. 9 illustrates an example of a sampling circuit of a touch detection circuit included in a touch circuit in a touch display device according to embodiments of the present disclosure.

FIG. 9 illustrates an example of a sampling circuit of a touch detection circuit included in a touch circuit in a touch display device according to embodiments of the present disclosure.

Referring to FIG. 9, in the touch display device 100 according to embodiments of the present disclosure, the sampling circuit 226 of the touch detection circuit 220 included in the touch circuit 200 can include an operational amplifier Amp2 in which the output line of the circuit 224 is connected to the inverting input terminal (−) and a reference voltage Vref1 is applied to the non-inverting input terminal (+), a feedback capacitor Cfb2 connected in parallel between and an inverting input terminal (−) and the output terminal of the operational amplifier Amp2, and a reset switch SWrst2. The voltage accumulated in the capacitor C1 of the integrating circuit 224 can be charged in the feedback capacitor Cfb2 and transmitted to the touch controller TCR as a touched sensing detection signal Sout.

The pen detection circuit 230 can include a pre-amplification circuit 222, a comparison circuit 232, and a level shifter 234. For example, the pre-amplification circuit 222 is a component that amplifies the touch sensing signal TSS transmitted from the display panel 110 to a certain level, and can be commonly included in the touch detection circuit 220 and the pen detection circuit 230.

Figure 10:
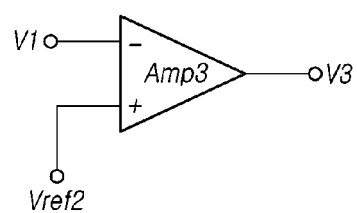
FIG. 10 illustrates an example of a comparison circuit of a pen detection circuit included in a touch circuit in a touch display device according to embodiments of the present disclosure.

FIG. 10 illustrates an example of a comparison circuit of a pen detection circuit included in a touch circuit in a touch display device according to embodiments of the present disclosure.

Referring to FIG. 10, in the touch display device 100 according to embodiments of the present disclosure, the comparison circuit 232 of the pen detection circuit 230 included in the touch circuit 200 can include an operational amplifier Amp3 that receives the voltage V1 output from the pre-amplification circuit 222 through the inverting input terminal (−) and receives the reference voltage Vref2 through the non-inverting input terminal (+).

The operational amplifier Amp3 compares the saw tooth-shaped voltage (V1) output from the pre-amplification circuit 222 with the reference voltage Vref2 to generate a pulse-shaped output signal V3, and transmits it to the level shifter 234.

The level shifter 234 generates the pen detection signal Pout by transitioning the output signal V3 of the comparison circuit 232 to a level within a certain range so that the micro control unit 300 can process it.

Here, the signal whose level is shifted through the level shifter 234 is referred to as the pen detection signal Pout, but the level shifter 234 can be omitted as necessary. In this case, the signal output from 232 the comparison circuit can be the pen detection signal Pout.

The micro control unit 300 generates the touch driving signal TDS to be synchronized with the pen detection signal Pout transmitted from the touch circuit 200, and transmits it to the touch circuit 200.

Accordingly, the touch display device 100 of the present disclosure does not uplink the beacon signal or the ping signal, and uses the pen driving signal Pds transmitted from the stylus to the pen driving signal Pds, thereby generating a synchronized touch driving signal TDS.

Figure 11:
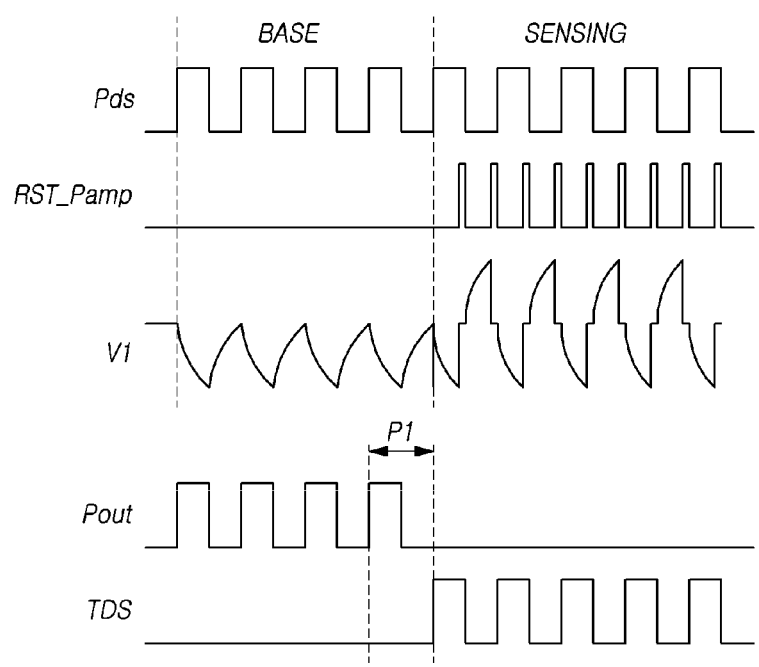
FIG. 11 illustrates a signal waveform of a process of generating a touch driving signal synchronized with a pen driving signal in a touch display device according to embodiments of the present disclosure.

FIG. 11 illustrates a signal waveform of a process of generating a touch driving signal synchronized with a pen driving signal in a touch display device according to embodiments of the present disclosure.

Referring to FIG. 11, in the touch display device 100 according to embodiments of the present disclosure, a period in which the touch driving signal TDS is generated so as to be synchronized with the pen driving signal Pds can be referred to as a base period BASE. The period in which the pen touch is sensed using the touch driving signal TDS synchronized with the pen driving signal Pds can be referred to as a sensing period SENSING.

The pen driving signal Pds and the touch driving signal TDS can be synchronized in a positive phase or in an inverse phase.

When the pen driving signal Pds and the touch driving signal TDS are synchronized in a positive phase, the rising edge and the falling edge of the pen driving signal Pds and the touch driving signal TDS are synchronized with the same direction.

On the other hand, when the pen driving signal Pds and the touch driving signal TDS are synchronized in reverse phase, the falling edge of the touch driving signal TDS is synchronized with the rising edge of the pen driving signal pds, and the rising edge of the touch driving signal TDS is synchronized with the falling edge of the pen driving signal Pds.

Before applying data to the touch display device 100, the stylus can apply a base pulse signal at a constant interval to the display panel 110 during the base period BASE having a constant time interval.

During the base period BASE in which the base pulse signal is applied from the stylus, the pre-amplification circuit 222 of the touch circuit 200 turns the reset switch SWrst1 off by the low-level reset signal RST_Pamp.

As a result, the pre-amplification circuit 222 compares the touch sensing signal TSS generated on the display panel 110 by the base pulse signal with a common voltage Vcom of a predetermined level, and then generates an output signal V1 that toggles in the opposite direction of the signal.

The comparison circuit 232 can generate the pen detection signal Pout in the form of a pulse by comparing the output signal V1 of the pre-amplification circuit 222 with the reference voltage Vref2. Of course, the level of the output signal of the comparison circuit 232 is adjusted by the level shifter 234 to generate the pen detection signal Pout.

The pen detection signal Pout is transmitted to the micro control unit 300, and the micro control unit 300 can generate the touch driving signal TDS synchronized with the pen detection signal Pout.

Figure 12:
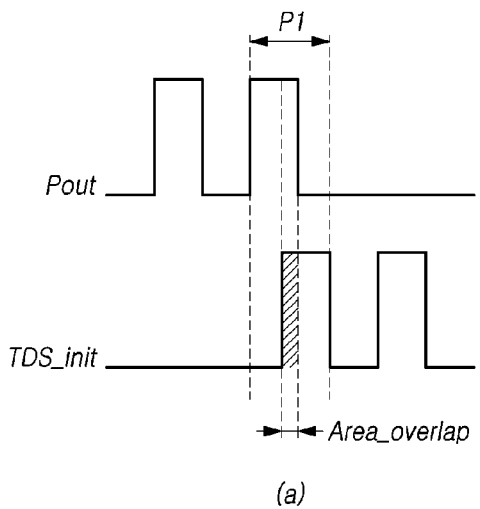
FIG. 12 illustrates an example of a method of determining a generation timing of a touch driving signal in a touch display device according to embodiments of the present disclosure.
Figure 12:
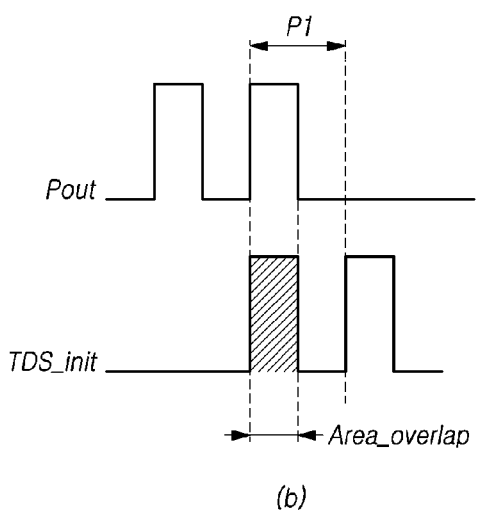

FIG. 12 illustrates an example of a method of determining a generation timing of a touch driving signal in a touch display device according to embodiments of the present disclosure.

Referring to FIG. 12, in the touch display device 100 according to embodiments of the present disclosure, the micro control unit 300 generates an initial touch driving signal TDS_init, and sequentially delays it and compares it with the pen detection signal Pout transmitted from the touch circuit 200.

For example, the micro control unit 300 detects a peak period and a peak value in which the pen detection signal Pout output from the touch circuit 200 indicates a high level, and sequentially compares it with an area overlapped with the initial touch driving signal TDS_init based on one period P1 in which the last high level is included in the pen detection signal Pout within the base period BASE.

In this case, the output of the comparison signal can vary according to an area Area_overlap in which the initial touch driving signal TDS_init and the pen detection signal Pout overlap at the high level.

As in the case of (b) of FIG. 12, when the area Area_overlap where the initial touch driving signal TDS_init and the pen detection signal Pout overlap is the largest, the intensity of the comparison signal is highest. By detecting this time point, the touch driving signal TDS synchronized with the pen driving signal Pds can be generated.

Therefore, by comparing the overlapping area of the sequentially delayed initial touch driving signal TDS_init and the pen detection signal Pout, the initial touch driving signal at the point where the overlapping area is the largest is the touch driving signal TDS is set to the timing of the touch driving signal.

Then, when the touch driving signal TDS is generated according to the detected timing after one period P1 when the last high level is included in the pen detection signal Pout, the touch driving signal TDS can be synchronized with the pen driving signal Pds of the stylus.

In the above, the case of generating the touch driving signal TDS synchronized thereto by using the pen detection signal Pout in the micro control unit 300 has been described as an example. When the micro control unit 300 and the touch circuit 200 are configured as one integrated circuit to form a touch integrated circuit, the touch integrated circuit generates the touch driving signal TDS that is synchronized with the pen driving signal Pds. It can be considered that the touch control unit including the micro control unit 300 and the touch circuit 200 generates the touch driving signal TDS synchronized with the pen driving signal Pds.

On the other hand, when the touch circuit 200 and the micro control unit 300 are separated, the touch circuit 200 can receive the initial touch driving signal TDS_init from the micro control unit 300, and directly generate the touch driving signal TDS synchronized with the pen detection signal Pout.

Figure 13:
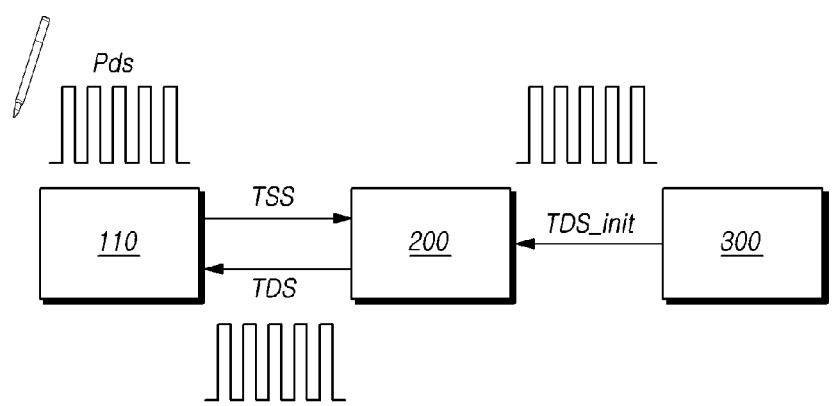
FIG. 13 conceptually illustrates a structure in which a touch circuit generates a touch driving signal synchronized with a stylus in a touch display device according to another exemplary embodiment of the present disclosure.

FIG. 13 conceptually illustrates a structure in which a touch circuit generates a touch driving signal synchronized with a stylus in a touch display device according to another exemplary embodiment of the present disclosure.

Referring to FIG. 13, a touch display device 100 according to still other embodiments of the present disclosure can include a display panel 110, a touch circuit 200, and a micro control unit 300.

The display panel 110 generates a touch sensing signal TSS by the pen driving signal Pds transmitted from the stylus.

The touch circuit 200 receives the touch sensing signal TSS transmitted from the display panel 110 through a plurality of sensing lines, and generates a pen detection signal Pout using this.

In addition, the touch circuit 200 controls the timing of an initial touch driving signal TDS_init transmitted from the micro control unit 300, and the touch driving signal TDS synchronized with the pen driving signal Pds.

For example, the touch circuit 200 sequentially delays the initial touch driving signal TDS_init transmitted from the micro control unit 200, detects a timing synchronized with the pen detection signal Pout, and uses the initial touch driving signal TDS_init modulated to be synchronized with the detection signal Pout as the touch driving signal TDS. As a result, the touch circuit 200 can supply the touch driving signal TDS synchronized with the pen driving signal Pds of the stylus to the display panel 110.

Figure 14:
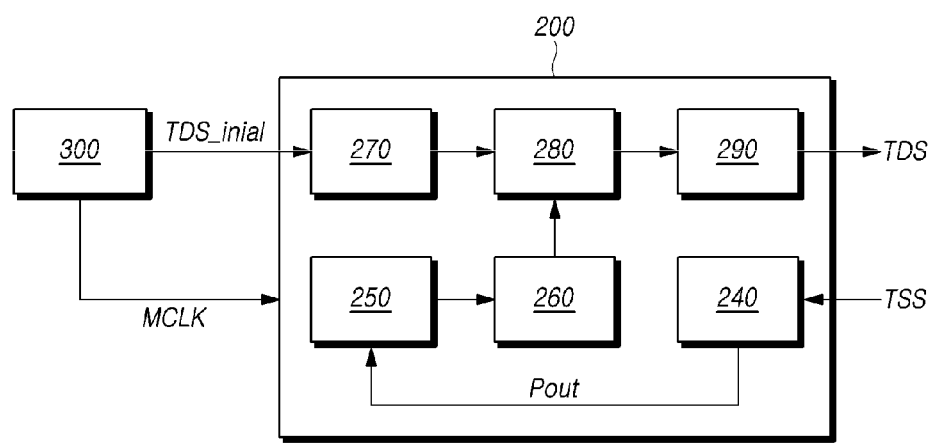
FIG. 14 is a block diagram of a touch circuit for generating a touch driving signal synchronized with a stylus in a touch display device according to an embodiment of the present disclosure.

FIG. 14 is a block diagram of a touch circuit generating a touch driving signal synchronized with a stylus in a touch display device according to still embodiment of the present disclosure.

Referring to FIG. 14, in the touch display device 100 according to still another embodiment of the present disclosure, a touch circuit 200 for generating a touch driving signal TDS synchronized with the stylus can include a pen detection circuit 240, a peak detection circuit 250, a counter 260, a delay circuit 270, a multiplexer 280, and a touch driving signal generation circuit 290.

The touch circuit 200 can correspond to a touch sensing circuit ROIC, and can include a touch controller TCR that determines the presence or absence of a touch and a touch position using the touch sensing detection signal Sout.

The pen detection circuit 240 generates a pen detection signal Pout corresponding to the pen driving signal Pds of the stylus from the touch sensing signal TSS transmitted from the display panel 110. The pen detection circuit 240 can include a pre-amplification circuit 222 and a comparison circuit 232.

The pre-amplification circuit 222 is a component that amplifies the touch sensing signal TSS transmitted from the display panel 110 to a predetermined level.

The comparison circuit 232 can include an operational amplifier Amp receiving the voltage V1 output from the pre-amplification circuit 222 through the inverting input terminal (−), and the reference voltage Vref2 through the non-inverting input terminal (+). Accordingly, the operational amplifier Amp3 compares the saw tooth-shaped voltage V1 output from the pre-amplification circuit 222 with the reference voltage Vref2 to generate the pen detection signal Pout.

The peak detection circuit 250 detects the peak period and the peak value in which the pen detection signal Pout output from the pen detection circuit 240 indicates the high level. In this case, since the pen detection signal Pout appears in the form of a pulse, a plurality of periods having the high level can appear in the base period BASE. Therefore, one period P1 including the last high level within the base period BASE is set as the reference period, and it is effective to delay the initial touch driving signal TDS_init within the last period P1 of the pen driving signal Pds and then compare it with the pen detection signal Pout.

The counter 260 counts the number of times the pen detection signal Pout maintains the high level during the reference period P1 including the last high level in the base period BASE based on a main clock MCLK.

The delay circuit 270 sequentially delays the initial touch driving signal TDS_init generated by the micro control unit 300 according to the main clock MCLK.

The multiplexer 280 overlaps the delayed initial touch driving signal TDS_init transmitted from the delay circuit 270 and the peak value and the peak period of the pen detection signal Pout transmitted through the counter 260. As a result, when an area where the initial touch driving signal TDS_init and the pen detection signal Pout overlap is the largest in the reference period P1, the intensity of the comparison signal by the multiplexer 280 is the highest.

Therefore, the initial touch driving signal TDS_init and the pen detection signal Pout and the pen driving signal Pds can be determined to be synchronized at the point at which the area where the initial touch driving signal TDS_init and the pen detection signal Pout overlap is largest within the reference period P1.

Accordingly, the touch driving signal generating circuit 290 generates the touch driving signal TDS synchronized with synchronized with the pen driving signal Pds of the stylus according to the timing where the overlapping area of the initial touch driving signal TDS_init and the pen detection signal Pout is the largest.

Figure 15:
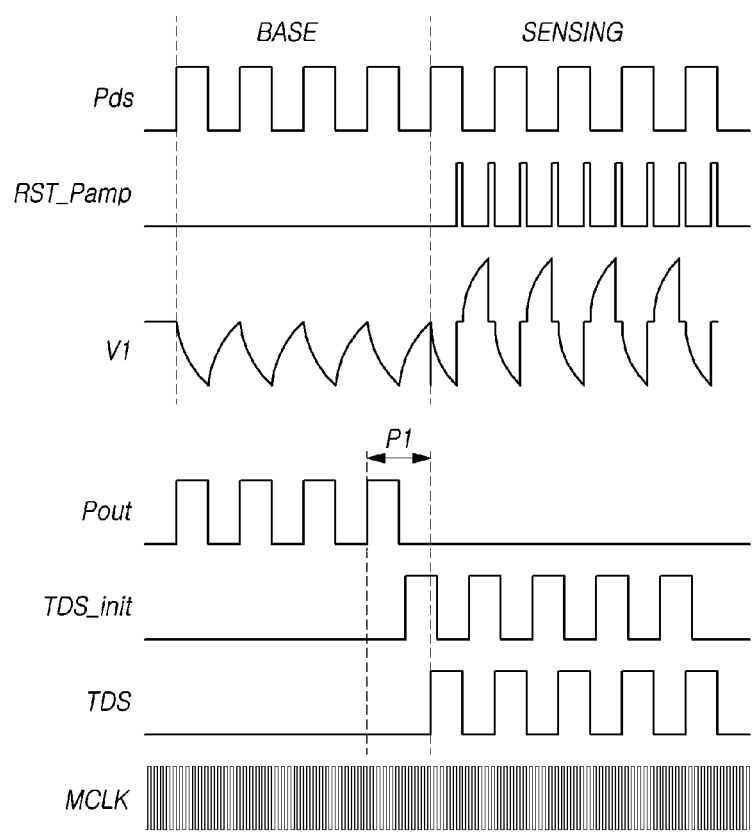
FIG. 15 illustrates a signal waveform of a process of generating a touch driving signal synchronized with a pen driving signal in a touch display device according to embodiments of the present disclosure.

FIG. 15 illustrates a signal waveform of a process of generating a touch driving signal synchronized with a pen driving signal in a touch display device according to embodiments of the present disclosure.

Referring to FIG. 15, in the touch display device 100 according to embodiments of the present disclosure, a period in which the touch driving signal TDS is generated so as to be synchronized with the pen driving signal Pds can be referred to as the base period BASE. A period in which the pen touch is sensed using the touch driving signal TDS synchronized with the pen driving signal Pds can be referred to as the sensing period SENSING.

Before applying data to the touch display device 100, the stylus can apply a base pulse signal at a constant interval to the display panel 110 during a base period BASE having a constant time interval.

During the base period BASE in which the base pulse signal is applied from the stylus, the pre-amplification circuit 222 of the pen detection circuit 240 turns a reset switch SWrst1 off by a low-level reset signal RST_Pamp.

As a result, the pre-amplification circuit 222 compares the touch sensing signal TSS generated on the display panel 110 by the base pulse signal with a common voltage Vcom of a predetermined level, and generates an output signal V1 that toggles in the opposite direction of the signal.

The comparison circuit 232 can generate a pen detection signal Pout in the form of a pulse by comparing the output signal V1 of the pre-amplification circuit 222 with the reference voltage Vref2. Of course, the level of the output signal of the comparison circuit 232 is adjusted by the level shifter 234 to generate the pen detection signal Pout.

At this time, the touch circuit 200 sequentially delays the initial touch driving signal TDS_init transmitted from the micro control unit 300, compares it with the pen detection signal Pout to drive the initial touch, and detect a point in time at which an area where the signal TDS_init and the pen detection signal Pout overlap is the largest.

For example, the pen detection signal Pout can detect the peak period indicating the high level and the peak value, and thus calculate a point in time at which an area where the initial touch driving signal TDS_init and the pen detection signal Pout overlap is largest by using one period P1 including the last high level within the base period BASE as the reference period.

Therefore, by generating the touch driving signal TDS according to the timing where the overlapping area of the initial touch driving signal TDS_init and the pen detection signal Pout is the largest, the touch driving signal TDS synchronized with the pen driving signal Pds of the stylus and can be generated, and the pen driving signal Pds of the stylus can be sensed.

As a result, the touch display device 100 of the present disclosure generates the touch driving signal TDS synchronized with the pen driving signal Pds of the stylus, thereby sensing the pen driving signal Pds of the stylus irrespective of the protocol of the stylus and simplifying the configuration of the stylus and reducing its power consumption.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention.

The above description and the accompanying drawings provide an example of the technical idea of the present invention for illustrative purposes only. For example, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A touch display device, comprising:
a display panel on which a touch screen panel including a plurality of touch electrodes is embedded; and
a touch control unit configured to generate a pen detection signal corresponding to a pen driving signal of a stylus from a touch sensing signal transmitted from the display panel, and generate a touch driving signal synchronized with the pen driving signal of the stylus by using the pen detection signal, wherein the touch control unit comprises a pen detection circuit at least comprising:
a pre-amplification circuit configured to amplify the touch sensing signal transmitted from the display panel to a certain level; and
a comparison circuit configured to compare an output signal of the pre-amplification circuit and a reference signal and output a pulse-shaped signal to generate the pen detection signal.

2. The touch display device according to claim 1, wherein the pen driving signal is divided into a base period in which data related to the stylus is not included and a sensing period in which the data related to the stylus is included, and
the touch driving signal is synchronized with the pen driving signal in the sensing period.

3. The touch display device according to claim 2, wherein the pen detection signal is a signal generated by the pen driving signal in the base period.

4. The touch display device according to claim 1, wherein the pen driving signal and the touch driving signal are synchronized in a positive phase or an inverse phase.

5. The touch display device according to claim 1, wherein the touch control unit further comprises:
a peak detection circuit configured to detect a peak period and a peak value in which the pen detection signal indicates a high level;
a counter configured to count the number of times the pen detection signal maintains the high level during a reference period including a last high level within the base period based on a main clock;
a delay circuit configured to sequentially delay the initial touch driving signal according to the main clock;
a multiplexer configured to overlap the initial touch driving signal delayed through the delay circuit, and the peak value and the peak period of the pen detection signal transmitted through the counter; and
a touch driving signal generation circuit configured to generate a touch driving signal according to a point in time when an overlapping area of the initial touch driving signal and the pen detection signal is largest.

6. The touch display device according to claim 5, wherein the pen detection circuit further comprises a level shifter configured to generate the pen detection signal by transitioning the signal output from the comparison circuit to a level within a certain range.

7. The touch display device according to claim 5, wherein the pre-amplification circuit comprises:
an operational amplifier configured to receive the touch sensing signal through an inverting input terminal; and
a feedback capacitor and a reset switch connected in parallel between the non-inverting input terminal and the output terminal of the operational amplifier.

8. The touch display device according to claim 7, wherein the reset switch is turned off by a low-level reset signal during the base period, and
the pre-amplification circuit generates an output signal that is toggled in a direction opposite to the base pulse signal.

9. The touch display device according to claim 5, wherein the multiplexer overlaps the initial touch driving signal and the pen detection signal during a reference period including a last high level in the base period based on a main clock.

10. A touch circuit, comprising:
a pen detection circuit configured to generate a pen detection signal corresponding to a pen driving signal from a touch sensing signal;

a peak detection circuit configured to detect a peak period and a peak value in which the pen detection signal indicates a high level;

a counter configured to count the number of times the pen detection signal maintains the high level during a reference period including a last high level within a base period based on a main clock;

a delay circuit configured to sequentially delay an initial touch driving signal according to the main clock;

a multiplexer configured to overlap the initial touch driving signal delayed through the delay circuit, and the peak value and the peak period of the pen detection signal transmitted through the counter; and a touch driving signal generation circuit configured to generate a touch driving signal according to a point in time when an overlapping area of the initial touch driving signal and the pen detection signal is largest.

11. A touch driving method comprising:

generating a pen detection signal corresponding to a pen driving signal of a stylus from a touch sensing signal transmitted from a display panel using a touch control unit included in a touch display device; and generating the touch driving signal synchronized with the pen driving signal of the stylus using a pen detection signal, wherein the touch control unit at least comprises:

a pre-amplification circuit configured to amplify the touch sensing signal transmitted from the display panel to a certain level; and a comparison circuit configured to compare an output signal of the pre-amplification circuit and a reference signal and output a pulse-shaped signal to generate the pen detection signal.

12. The touch driving method according to claim 11, wherein the pen driving signal is divided into a base period in which data related to the stylus is not included and a sensing period in which the data related to the stylus is included, and the touch driving signal is synchronized with the pen driving signal in the sensing period.

13. The touch driving method according to claim 12, wherein the pen detection signal is a signal generated by the pen driving signal in the base period.

14. The touch driving method according to claim 12, wherein the pen driving signal and the touch driving signal are synchronized in a positive phase or an inverse phase.

* * * * *